United States Patent [19]
Martin et al.

[11] 3,969,947
[45] July 20, 1976

[54] TAPERED TOOTH SPROCKET

[75] Inventors: Virgil B. Martin, West Bend; Roger L. Villers, Fredonia, both of Wis.

[73] Assignee: Gehl Company, West Bend, Wis.

[22] Filed: May 22, 1975

[21] Appl. No.: 580,027

[52] U.S. Cl. .............................................. 74/243 R
[51] Int. Cl.² ......................................... F16H 55/30
[58] Field of Search ....... 74/243 R, 243 DR, 243 C, 74/243 CS

[56] References Cited
UNITED STATES PATENTS
3,162,057  12/1964  Burrell ........................... 74/243 DR
FOREIGN PATENTS OR APPLICATIONS
957,613  2/1950  France ............................ 74/243 R Primary Examiner—Leonard H. Gerin
Attorney, Agent, or Firm—James E. Nilles

[57] ABSTRACT

A sprocket rotatable about a vertical axis and engaging a flexible roller chain having a sagging oncoming flight has a sloped portion on the upper side of each tooth near the forwardly moving edge thereof to facilitate initial engagement with the underside of the upper link plate of an oncoming sagging chain link and to lift the link plate up onto an adjacent flat horizontal surface near the tooth root whereby the chain link is firmly supported horizontally while engaged with the tooth. Preferably, each tooth has two oppositely sloped surfaces defining sloped edges and a commonly usable flat surface on its upper and lower sides so that the sprocket can be mounted for rotation in either direction regardless of which side faces upward.

10 Claims, 5 Drawing Figures

TAPERED TOOTH SPROCKET

BACKGROUND OF THE INVENTION

1. Field of Use

This invention relates generally to tapered tooth sprockets such as are used with flexible roller chains and, in particular, to the configuration of the sprocket teeth.

2. Description of the Prior Art

Some chain drives, such as are used in agricultural machinery or the like, employ a drive sprocket and a driven sprocket, both rotatable about generally vertical axes, and connected by an endless flexible single strand chain wherein both chain flights move in a common plane transverse to the sprocket axes. In such arrangements, using conventional tapered tooth sprockets, the chain flights tend to sag downwardly under the force of gravity and there is some initial misalignment and interference between each advancing sprocket tooth and the oncoming chain link with which it must engage. This results in undue friction and wear on the chain and the sprocket teeth and necessitates eventual replacement of either or both compartments. In addition, conventional tapered tooth sprockets are constructed so that the chain links are not firmly and optimumly supported when a chain link and a sprocket tooth are fully engaged and this can result in undesirable misalignment of chain components and additional friction and wear.

SUMMARY OF THE PRESENT INVENTION

In accordance with the invention there is provided a sprocket rotatable about a vertical axis and engaging a flexible roller chain having a sagging oncoming flight. Each sprocket tooth has a sloped surface defining sloped edge portions on the upper side thereof near the forwardly moving edge thereof to facilitate initial engagement with the underside of the upper link plate of an oncoming sagging chain link and to lift the link plate up onto an adjacent flat horizontal surface near the tooth root whereby the chain link is firmly supported horizontally while engaged with the tooth.

The sloped surface is flat and slopes downwardly from the flat horizontal surface in a direction radially outwardly from the center of the sprocket and also slopes downwardly in the direction of rotation of the tooth to define the sloped edge portions.

Preferably, each tooth has two oppositely sloped surfaces and a commonly usable flat surface on its upper and lower sides so that the sprocket can be mounted for rotation in either direction regardless of which side faces upward.

In a preferred arrangement wherein each tooth has two oppositely sloped surfaces and a commonly usable flat surface, the three surfaces are contiguous and join along straight boundary edges.

A sprocket having teeth in accordance with the invention can be economically fabricated by casting, forging or machining and is especially well-adapted for use with roller chains having links with vertically spaced upper and lower flat link plates and wherein the upper link plate engages the sloped tooth surface and comes to rest upon the flat horizontal tooth surface.

A sprocket in accordance with the invention reduces chain and sprocket tooth wear and reduces chain noise during operation. Other objects and advantages of the invention will hereinafter appear.

DRAWINGS

DESCRIPTION OF A PREFERRED EMBODIMENT

Figure 1:
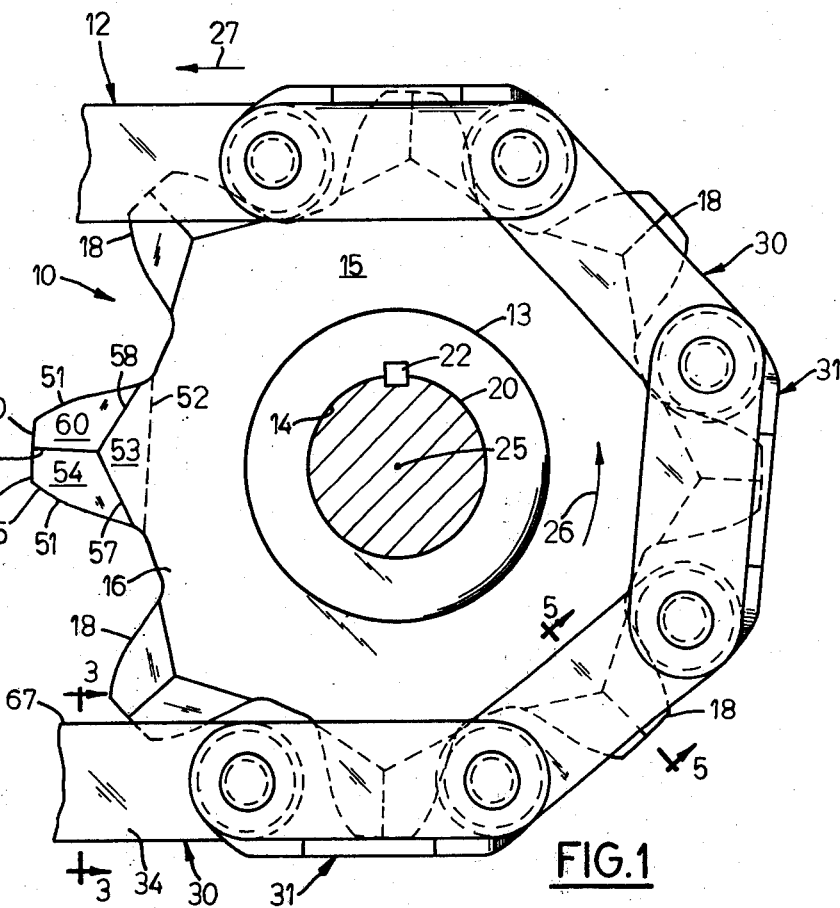
FIG. 1 is a top plan view of a tapered tooth sprocket having teeth in accordance with the invention and shown in engagement with a flexible roller chain.
Figure 2:
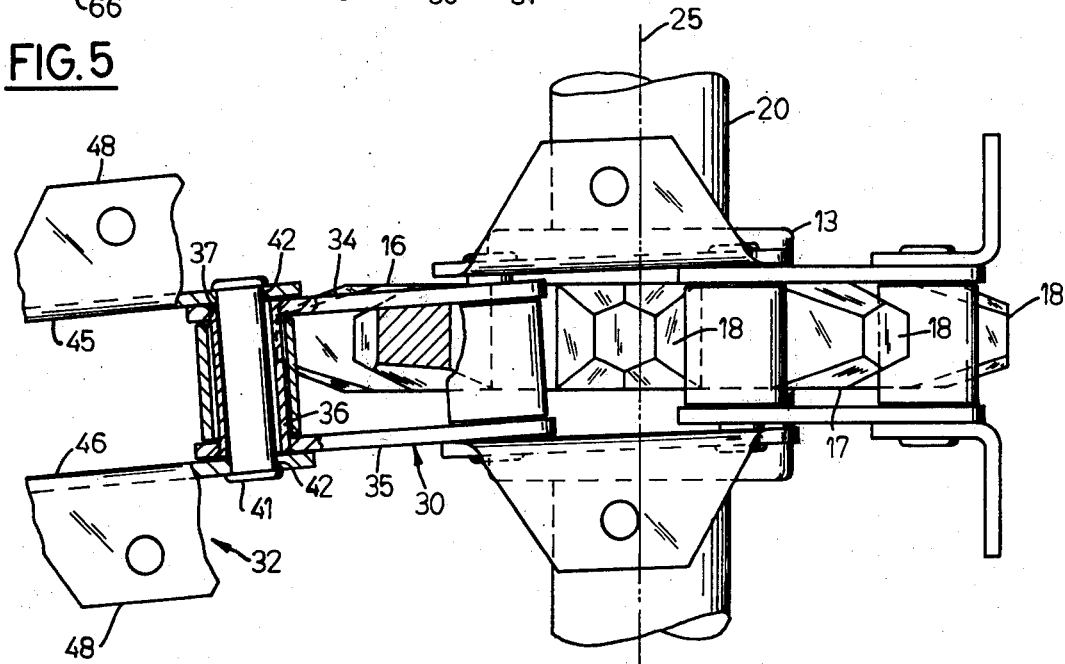
FIG. 2 is a side elevational view of the sprocket and chain shown in FIG. 1.

Referring to FIGS. 1 and 2 there is shown a portion of a chain drive comprising a tapered tooth sprocket 10 in accordance with the invention and a portion of a flexible single strand roller chain 12.

Sprocket 10, which may be fabricated by casting, forging or machining, comprises a central hub 13 having a shaft hole 14 therethrough; an outwardly extending flat portion 15 having upper and lower surfaces 16 and 17, respectively; and a plurality of sprocket teeth 18 which extend radially outwardly from the perimeter of portion 15. Sprocket 10 is shown as comprising eight equidistantly spaced teeth 18 but a greater or lesser number could be employed. Sprocket 10 is mounted on and is rotatable with a cylindrical shaft 20 which extends through shaft hole 14 and is secured to hub 13 by means of a key 22. Sprocket 10 may be a drive sprocket or a driven sprocket, depending on requirements.

Sprocket 10 is disposed for rotation about a generally vertical axis 25 and its teeth rotate in a plane which is normal to the axis. For purposes of the following discussion it is to be assumed that sprocket 10 rotates in the direction of arrow 26 and that chain 12 moves in the direction of the arrows 27. However, as will hereinafter appear, sprocket 10 is designed in accordance with the invention for rotation in opposite directions whether it is disposed on shaft 20 as shown, or reversely disposed thereon.

Referring to FIGS. 1 and 2, chain 12, which comprises a plurality of articulatable chain lines such as 30 and 31, has a portion which is in engagement with sprocket 10 and an oncoming flight 32. As FIG. 2 shows, chain flight 32 sags downwardly under the force of gravity and, therefore, is below and at an angle to the plane in which the sprocket teeth 18 rotate, whereas the portion of chain 12 which is in full engagement with sprocket 10 moves in the same plane as the sprocket teeth 18 and in alignment therewith. Sagging of chain flight 32 is possible because chain 12 is made up of a great number of discrete components which are relatively loosely connected to permit chain articulation and flexibility.

As hereinbefore mentioned, chain 12 comprises two types of links 30 and 31 which are alternately arranged but connected to one another. Only the links 30, hereinafter referred to as roller links, cooperate directly with sprocket teeth 18 in accordance with the invention as will hereinafter appear.

As FIGS. 1 and 2 show, each roller link 30 comprises a pair of vertically spaced apart flat upper and lower roller link plates 34 and 35, respectively, and these plates are rigidly interconnected at their opposite ends by hollow cylindrical bushings 36 which are secured in holes 37 in the roller link plates. A hollow cylindrical chain roller 40 is disposed around and rotatable on each bushing 36. A pin 41 extends through and is oscillatable within each bushing 36. The ends of each pin 41 extend through holes 42 in the ends of a pair of vertically spaced apart upper and lower pin link plates 45 and 46, respectively, and are rigidly secured thereto by upsetting or peening. The pin link plates 45 and 46 have a flat portion and may be provided with an angularly offset flange 48 for the attachment of components to be moved by the chain 12. As FIG. 2 shows, the vertical spacing between the pin link plates 45 and 46 is greater than the vertical spacing between the roller link plates 34 and 35 and, consequently, the upper pin link plates 45 do not directly contact the sprocket teeth 18.

As FIG. 1 best shows, the crest 50 of each tooth 18 is flat and the face, flank and fillet of each tooth form an involute curved surface generally designated 51. Each tooth 18 has an upper side and a lower side (with respect to FIG. 2, for example) and FIG. 1 shows plan views of the upper sides of the teeth. Each tooth 18 at or near its root is the same thickness as the portion 15 of sprocket 10.

In accordance with the invention each tooth 18 which is adapted to engage a roller link such as 30 is provided on its upper side with a level flat surface 53 near the tooth root and with a contiguous sloped flat surface 54 located along the advancing edge of the tooth, as FIG. 1 shows.

The level flat surface 53 is parallel with the plane in which the sprocket 10 rotates and would be horizontal if the sprocket axis 25 is absolutely vertical. However, it is contemplated that axis 25 may not be absolutely vertical and chain sag problems would exist which can be overcome by a sprocket in accordance with the invention. Level flat surface 53 is bounded, for example, on its inboard side by an imaginary line designated 52 in FIG. 1 which can vary in its position and corresponds, for example, to the inboard edge of a roller link plate 34 supported by level flat surface 53. Level flat surface 53 is bounded on its outboard side by two level intersecting lines 57 and 58, which also define the inboard edge of the sloped flat surface 54 and the inboard edge of an oppositely sloped flat surface 60 contiguous to surfaces 54 and 53. The lines 57 and 58 project outwardly from the center of sprocket 10 and intersect with each other and with the inner end of a line or edge 61 hereinafter described. Thus, the level surface 53 forms a relatively large surface area for fully supporting the undersurface of a roller link plate 34.

The surfaces 54 and 60 meet or intersect along the line 61 or edge portion which slopes downwardly in a direction away from the center of sprocket 10. Sloped surface 54 is also bounded by the edge portions 55 and 56 of tooth 18. Edge 55 slopes downwardly from the center of the sprocket and edge 56 slopes downwardly in the direction of arrow 26. Surface 54 slopes downwardly in a direction away from the center of sprocket 10 and also slopes downwardly in the direction of advancing movement of tooth 18, i.e., in the direction of arrow 26.

Sloped surface 60 is usable or comes into play only when sprocket 10 is rotating in a direction opposite to arrow 26. Surface 60 also slopes downwardly in a direction away from the center of sprocket 10 and slopes downwardly in a direction opposite to arrow 26.

The lower side of a tooth 18 is provided with sloped surfaces 64 and 65 and a level surface 66 which are mirror images of the surfaces 60, 54 and 53 hereinbefore described and the sloped edges come into play when sprocket 10 is reversely disposed or turned upside-down from the position shown in the drawings and rotating in either direction.

Figure 3:
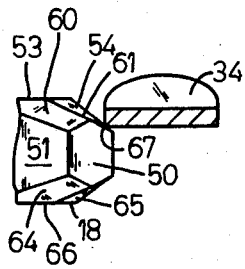
FIG. 3 is an elevational view partly in section, taken on line 3—3 of FIG. 1 and showing a sloped surface of a sprocket tooth making initial engagement with the underside of the upper roller link plate of a chain link.
Figure 4:
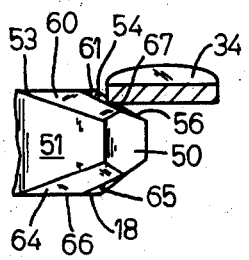
FIG. 4 is a view similar to FIG. 3 and showing a sprocket tooth more fully engaged with and elevating the upper roller link plate along the sloped surface.
Figure 5:
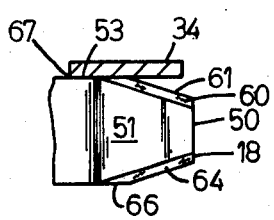
FIG. 5 is an elevational view, partly in section, taken on line 5—5 of FIG. 1 and showing a sprocket tooth in full engagement with the upper roller link plate with the plate resting horizontally on a flat surface near the tooth root.

Sprocket 10 and chain 12 cooperate as follows in accordance with the invention. As FIGS. 1, 2 and 3 make clear, when a tooth 18 approaches the inner side of an oncoming sagging roller link 30, the sloped surface 54 enables the tooth to enter beneath the underside of the downwardly displaced upper roller link plate 34. As sprocket 10 continues to rotate into the link 30, the sloped tooth edge 55 makes contact with the lower inboard edge 67 of link plate 34 and causes it to ride up, first onto sloped tooth edge 55, then onto edge 56 (see FIG. 3), then onto sloped tooth edge 61 (see FIG. 4) and finally onto level flat surface 53 (see FIG. 5). In this manner initial contact between a tooth 18 and a roller link plate 34 is controlled and the roller link 30 is gradually raised from a sagging position (shown in FIG. 2) to a position wherein it is fully engaged with sprocket 10 and supported level with the sprocket as the undersurface of roller link plate 34 comes into full engagement with level surface area 53 at the tooth root.

As will be understood, the components forming chain 12 are relatively loosely connected and may assume slightly different relative positions as the links advance into engagement with the sprocket 10. Thus, it is conceivable in some instances that edge 67 of upper roller plate 34 may make its initial contact directly with edge 56 or 61 rather than edge 55. Nevertheless, the end result during operation of the sloped surfaces and edges is to improve and control initial contact between the sprocket teeth and the roller links, thereby reducing component wear and to guide the roller link into a position on the tooth wherein it is firmly supported on and in alignment with the sprocket 10.

We claim:

1. In a sprocket rotatable in at least one direction about an axis: a plurality of teeth radially extending in a plane normal to said axis, each tooth having an upper side and a lower side, at least some of said teeth each having on the upper side thereof a surface level with said plane located near the tooth root and a portion contiguous with said surface which slopes downwardly away from the center of said sprocket and downwardly in said one direction.

2. A sprocket according to claim 1 wherein said portion is an edge.

3. A sprocket according to claim 2 wherein said edge is defined by a sloped surface.

4. In a sprocket rotatable in opposite directions about an axis: a plurality of teeth radially extending in a plane normal to said axis, each tooth having an upper side and a lower side, at least some teeth each having on the upper side thereof a surface level with said plane located near the tooth root, a first edge portion contiguous with said surface which slopes downwardly away from the center of said sprocket, a second edge portion contiguous with the outboard end of said first edge portion and which slopes downwardly in one direction of rotation of said sprocket, and a third edge portion contiguous with the outboard end of said first edge portion and which slopes downwardly in the other direction of rotation of said sprocket.

5. A sprocket according to claim 4 where some teeth each have on the lower side thereof a surface level with said plane located near the tooth root, a first edge portion contiguous with said surface which slopes downwardly away from the center of said sprocket, a second edge portion contiguous with the outboard end of said first edge portion and which slopes downwardly in one direction of rotation of said sprocket, and a third edge portion contiguous with the outboard end of said first edge portion and which slopes downwardly in the other direction of rotation of said sprocket.

6. In a sprocket rotatable in at least one direction about an axis: a plurality of teeth radially extending in a plane normal to said axis, each tooth having an upper side and a lower side, at least some of said teeth each having on the upper side thereof a surface level with said plane located near the tooth root and a first sloped surface sloping downwardly away from said level surface in a direction away from the center of said sprocket and downwardy in said one direction of rotation toward the leading edge of said tooth, so as to provide a forwardly and downwardly sloped edge along the crest of said tooth and a sloped edge on the upper side of said tooth between said level surface and the crest edge of said tooth.

7. A sprocket according to claim 6 further rotatable in an opposite direction and including a second sloped surface on said upper side of said tooth sloping downwardly away from said level surface in a direction away from the center of said sprocket and downwardly in said opposite direction of rotation, so as to provide a rearwardly and downwardly sloped edge along the crest of said tooth, said second sloped surface intersecting said first sloped surface along said sloped edge on the upper side of said tooth.

8. A sprocket according to claim 7 including on said lower side of said teeth another of said level surfaces and another of said first and second sloped surfaces.

9. In combination: a sprocket rotatable in at least one direction about an axis and having teeth radially extending in a plane normal to said axis, each tooth having an upper and lower side, and a flexible chain having links engaged with said sprocket and links forming an oncoming flight downwardly displaced from said plane, at least some of said links comprising an upper link member, at least some of said teeth each having on its upper side a flat surface for supporting a link engaged with said sprocket parallel to said plane and a downwardly sloped portion for engaging the underside of an upper link member of a downwardly displaced oncoming link and directing said upper link member onto said flat surface.

10. In combination: a sprocket rotatable in at least one direction about an axis and having teeth radially extending in a plane normal to said axis, each tooth having an upper and lower side, and a flexible chain having links engaged with said sprocket and links forming an oncoming flight downwardly displaced from said plane, at least some of said links comprising an upper link member, each tooth having on its upper surface a flat surface parallel to said plane for supporting an upper link member of a chain link engaged with said sprocket, and a sloped surface contiguous with said flat surface and sloping downwardly away from said axis for engaging the underside of an upper link member of a downwardly displaced oncoming link in said flight.

* * * * *